US007080432B2

(12) United States Patent
Norwood

(10) Patent No.: US 7,080,432 B2
(45) Date of Patent: Jul. 25, 2006

(54) PISTON PIN SPIRAL OR WIRE LOCK RING INSERTION TOOL

(76) Inventor: Clyde Jewel Norwood, 2511 Providence Rd. South, Waxhaw, NC (US) 28173

( * ) Notice: Subject to any disclaimer, the term of this patent is extended or adjusted under 35 U.S.C. 154(b) by 0 days.

(21) Appl. No.: 10/264,783

(22) Filed: Oct. 4, 2002

(65) Prior Publication Data

US 2004/0064928 A1 Apr. 8, 2004

(51) Int. Cl.
*B23P 19/09* (2006.01)

(52) U.S. Cl. ........................................ 29/229; 29/240.5

(58) Field of Classification Search .................. 29/222, 29/240.5, 240, 229, 280, 282
See application file for complete search history.

(56) References Cited

U.S. PATENT DOCUMENTS 2,244,824 A * 6/1941 Caminez .................... 29/240.5
2,486,084 A * 10/1949 Webster ....................... 29/280
3,099,876 A * 8/1963 Lawles ........................ 29/229
3,348,293 A * 10/1967 Newton et al. ............ 29/240.5
3,861,020 A * 1/1975 Moewe ........................ 29/235
4,226,013 A * 10/1980 Helesfai ...................... 29/235
4,330,917 A * 5/1982 Dzurkovich ................. 29/235
5,214,831 A * 6/1993 Collins et al. ............. 29/240.5
5,802,694 A * 9/1998 Myles ......................... 29/240
6,421,899 B1 * 7/2002 Zitnay ....................... 29/240.5

* cited by examiner

*Primary Examiner*—Robert C. Watson
(74) *Attorney, Agent, or Firm*—Kennedy Covington Lobdell & Hickman, LLP

(57) ABSTRACT

A tool is disclosed, for inserting a multi-turn spiral lock, received by a groove of a piston assembly. The tool includes a handle, for transmitting manual torque forces, to enter a spiral, grooved head, or a profiled fitting, a wire lock ring. The spiral, grooved head, is manufactured, with a ½ turn medium-pitched, helical groove. This permits the ½ spire, after being assembled, to be easily pushed, and transferred, to a piston groove. Also, a wire lock end, equipped with a controlled sliding sleeve, allows the ring to be located on the tool, prior to assembly. This allows for an easy bore insertion to snap the wire lock into the bore groove.

4 Claims, 4 Drawing Sheets

1
2
2a
3
3a
4
4a
4b
5
6
6a
7
9
9a
9b
11
12
13
$F_1$
$F_2$

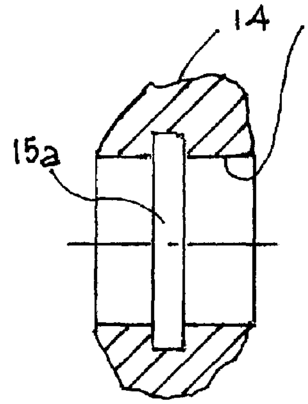
FIG 3-1
FIG 3-2
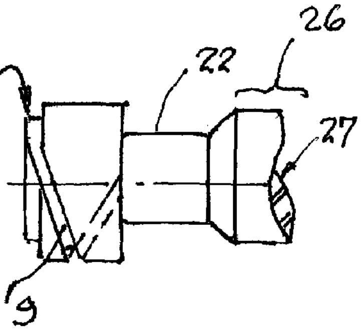
FIG 3_3
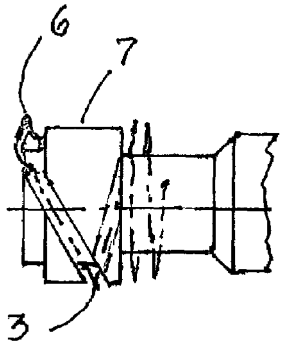
FIG 3-4
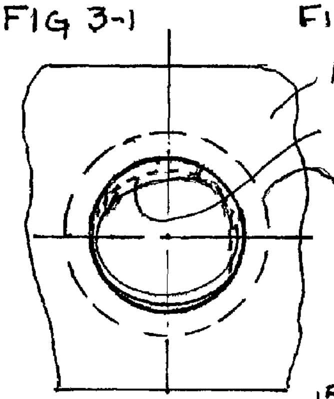
FIG 3-6
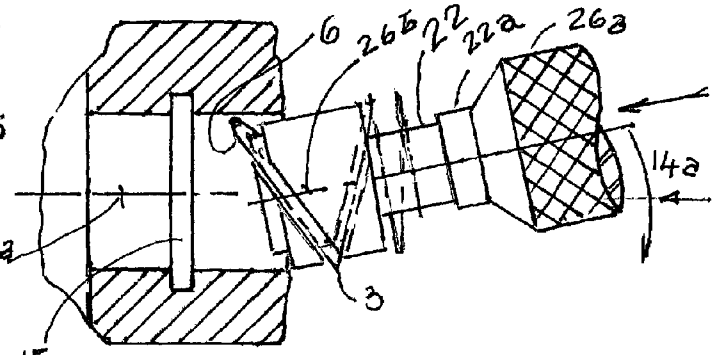
FIG 3-5
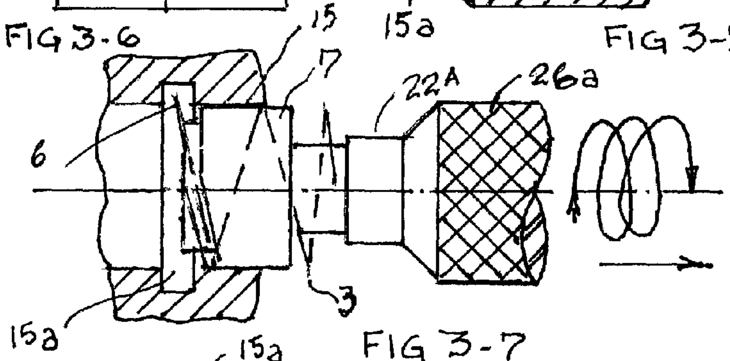
FIG 3-7
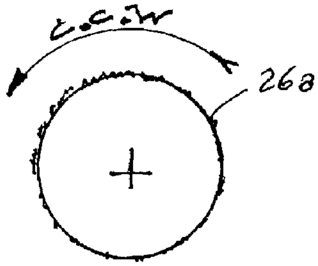
FIG 3-8
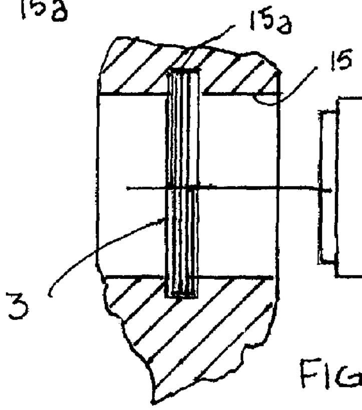
FIG 3-9
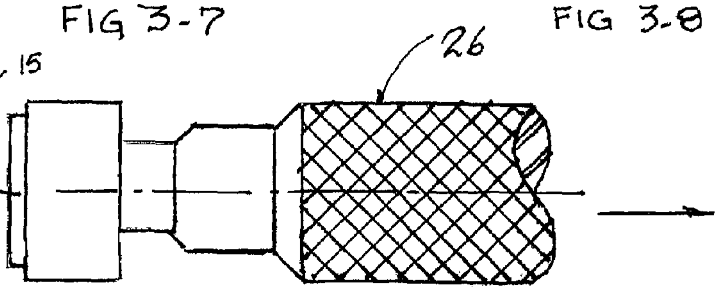
FIG 3.10

PISTON PIN SPIRAL OR WIRE LOCK RING INSERTION TOOL

TECHNICAL FIELD

This invention relates to an assembly tool used in an internal motor engine, a compressor or the like. More particularly, it is used for the installation of a spiral lock or wire lock ring, allowing the retention of the piston wrist pin into the piston head, cross bore.

BACKGROUND: PRIOR ART

The subject invention consists of a tool used to install a fastener on a work piece and the method of installing such a fastener. More specifically, this invention consists of a hand tool used to assemble a spiral lock or ring lock insert, thus retaining a wrist pin that holds the connection rod. Such a rod is actually being connected to a piston link and its mechanism. There is a further appreciation in that such an invention has broader applications. This is both a useful, simple tool and a time saver, for many applications where internal insertion through a grooved bore of helical or wires lock ring is required.

PRIOR ART

The assembly problem of a wrist pin retainer has been addressed for more than a century. The trend, however, has changed in the last few decades, as the retaining ring has become more popular, and the wire ring and helical lock ring have become standard in the industry, for medium and small engines. The manufacturer provides, and a patent search has shown, there are several systems with tool kits, for the removal and insertion, of such rings, but they require enormous pressure. This pressure presents a risk of scoring the surface, and also produces small metal scraps, which is very undesirable and could lead to damage to the engine.

The following is a list of Patent search references and several wrist pins were reviewed.

U.S. Pat. No. 4,445,800 Walker 1984

U.S. Pat. No. 4,640,641 Edelmayer 1987

U.S. Pat. No. 5,009,124 Baurepaire etal 1991

These three patents are relative to wrist pin manufacturer innovation only. They are not pertinent to the present applied patent.

U.S. Pat. No. 5,076,149 Everts 1991 shows a different way to retain the wrist pin, a way of deforming, in a controlled fashion, the ends of the wrist pins, making it permanent. This is also not pertinent to this present applied patent.

U.S. Pat. No. 5,289,758 Avco Lycoming Company 1994. This patent shows, on FIG. 2, another unique way to anchor a wrist pin that is fixed permanently to the piston head and is retained by two rings and two tapered plugs that are forced through a taper bore. This is not pertinent to this present applied patent.

U.S. Pat. No. 5,802,694 Myles 1998 shows a tool, which is similar to the proposed present patent. However, it is concerned with the removal of a spiral lock ring. Such an invention is a simple, economical, and versatile apparatus for removing the spiral lock from a piston assembly. This invention also provides a means of installing such a ring in a similar internal groove of a bore. This is quite different, and for this reason, it does not provide wire lock ring installation, such as a common, economical, simple tool would.

BRIEF DESCRIPTION OF THE INVENTION

The insertion of a spiral lock ring into a grooved bore, to establish a wrist pin abutment, is a difficult task. The spiral lock rings are made of hard spring steel, without much compressibility to decrease the outside diameter which is generally 0.060" larger than the bore. Also, the fact that such a ring is made of a rectangular section, and has at least three spires, makes it particularly incompressible. To enter such a ring into the piston cross bore, being a transitory conical bore, which has a greater diameter at one end (the top) than the ring with a smaller diameter, at the other end than the piston cross bore, so that the ring is pressed as it is transferred up to the internal groove, requires a great amount of pressure. This extreme pressure can contribute to scratching the aluminum (the bottom) bore area, with the accumulation of many scrap pieces, not desirable for an engine.

The present invention will provide a remedy with it's manual, combination for installing an internal spiral lock ring at one end, and a wire lock ring at the other end, into a grooved cross bore of a piston head. It is simple and easy to operate and can be handled without the fear of breaking a fingernail or cutting off the fingertip. The spiral ring head has a combination of details, which have been studied experimentally, and compound each other. This allows a smooth, progressive installation with a normal amount of effort. It consists of a spiral groove of a specific angle, size and length. A back slanting recess with a diameter allows a good grip for manually handling the grooved head and the knurl handle.

The wire lock ring has a means to safely install the ring in front of the head. It also retains the ring, which allows an easy bore transfer into the groove, with a simple sleeve cylinder around the inserting head. Because of its simplicity, and the fact that it has no intricate mechanism, such as a spring pivot, with its simple form, requires little dexterity and is a valuable, economical compact tool, with a double use for either spiral or wire lock rings. The spiral, lock and wire, lock rings, vary in size, especially for motors from ½" diameter to 1½" diameter. The detailed description, of this invention, starting on page 6, applies to lock ring diameters ranging from ⅜" in diameter to 1½" diameter.

BRIEF DRAWINGS' DESCRIPTION

Drawing #1 shows the basic concept of the tool function for the spiral lock ring insert.

FIG. 1-1 shows a front view of a spiral lock ring.

FIG. 1-2 shows the right hand side of the ring.

FIG. 1-3 shows a perspective view of the spiral lock manually opened and ready for insertion.

FIG. 1-4 shows the deflection of the first spire of the multi-spired ring

FIG. 1-5 shows a view of the center with a full 360° spire deflection.

FIG. 1-6 shows a side elevation of the grooved, spiral, tools left end.

FIG. 1-7 shows an enlargement of a partial section of the relative position 9*a* to the spiral groove on the fitted spring section.

Drawing #2 shows the basic insertion tool.

Figures 1, 2, 3, 4, 5, 6, 7:
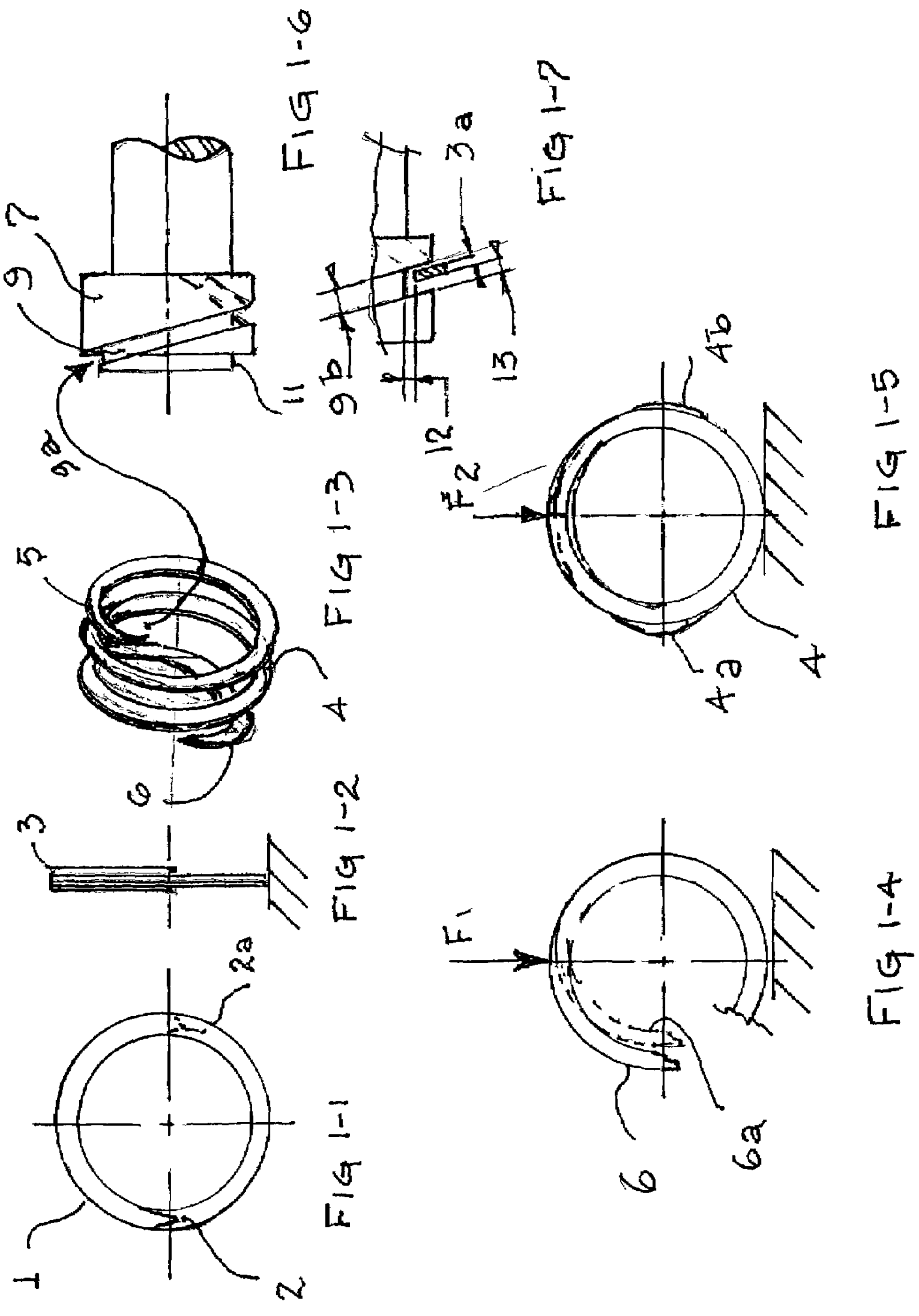
Figures 1, 2, 3, 4, 5, 6, 7, 8, 9, 10:
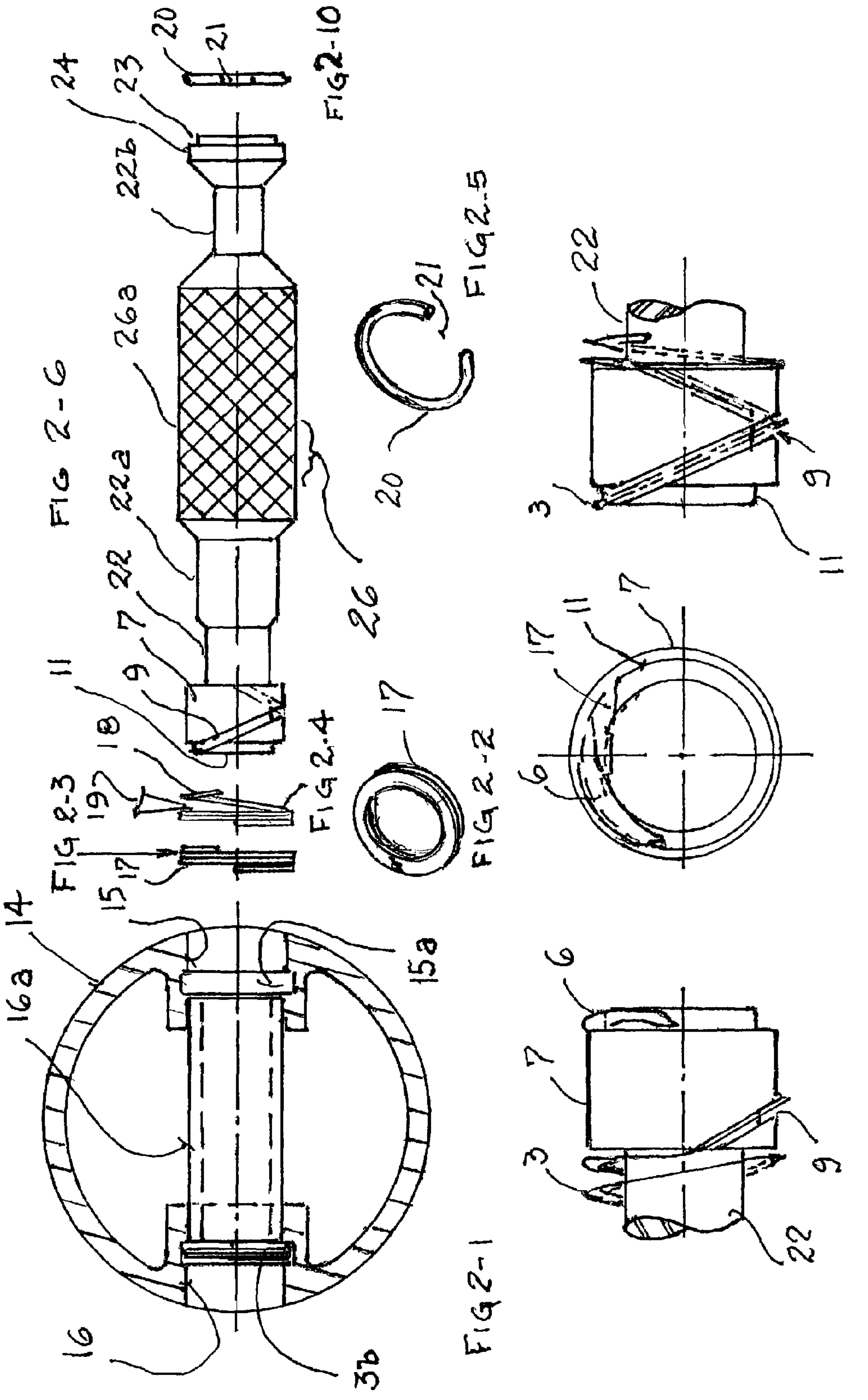
Figures 1, 2, 4, 5, 6, 7, 8, 9, 10:
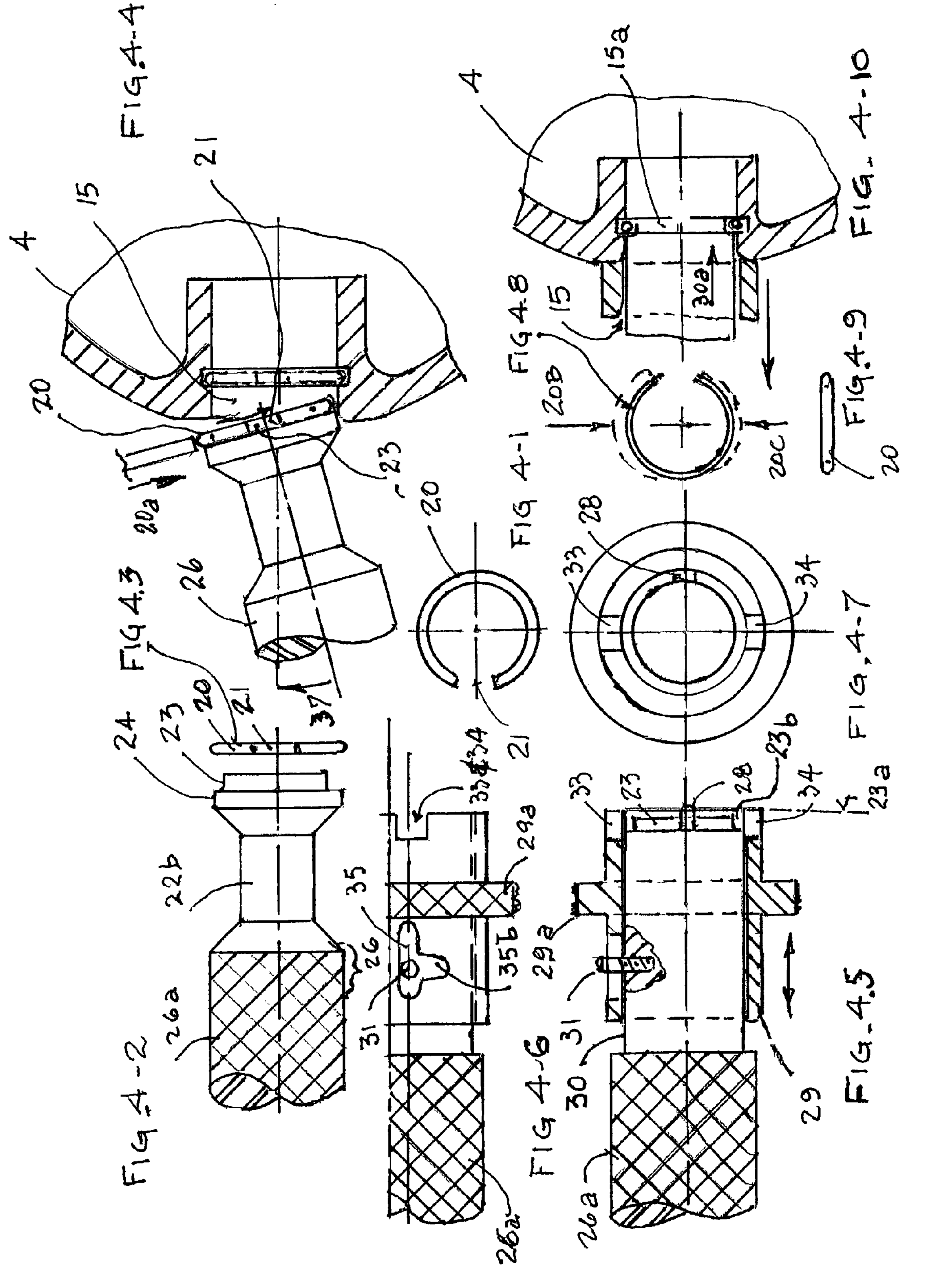

FIG. 2-1 shows a cross section of a piston head at the cross bore level.

FIG. 2-2 shows a perspective of a three-turn spiral lock ring.

FIG. 2-3 shows a profile elevation of the ring.

FIG. 2-4 shows how a thin, low, angular edge separates the first loop from the others.

FIG. 2-5 shows a perspective of the wire lock ring.

FIG. 2-6 shows the entire double-end insertion tool.

FIG. 2-7 shows a left-handed side view of the spiral lock installed on the tool head.

FIG. 2-8 shows a front view of the spiral lock inserted into the grooved head tool.

FIG. 2-9 shows the right end view of the spiral lock with the inserted grooved-head tool.

FIG. 2-10 shows a vertical wire lock ring profile.

Drawing #3 shows the spiral lock installation, from the top to the bottom.

FIG. 3-1 shows a section of the piston cross bore and the groove.

FIG. 3-2 shows the spiral lock ready to be assembled.

FIG. 3-3 shows the grooved, spiral tool of the left-hand head.

FIG. 3-4 shows the spiral assembly at the tools left hand head.

FIG. 3-5 shows a section of the cross bore and the angular tool ready to be inserted.

FIG. 3-6 shows a left end view of the tool and the first spire of the spiral lock.

FIG. 3-7 shows the first half of the spire, of the spiral lock, ready to enter the groove.

FIG. 3-8 shows a view of the right-handed section of the tool and CCW directional arrow.

FIG. 3-9 shows the spiral lock installed.

FIG. 3-10 shows the tool retracted from the cross bore.

Drawing #4 shows the tool end, which is used to install the wire lock ring.

FIG. 4-1 shows a front view of the ring.

FIG. 4-2 shows the profile of the simple wire lock assembly of the RH end tool.

FIG. 4-3 shows a profile of the wire ring.

FIG. 4-4 shows how the ring is inserted.

FIG. 4-5 shows a cross-section of the wire lock retainer slider, worked on the end shaft of the tool.

FIG. 4-6 shows an improved wire ring and the top ½ view of the assembly tool.

FIG. 4-7 shows the right-hand view of the tool end with its slider.

FIG. 4-8 shows the front view of the compressed wire lock.

FIG. 4-9 shows a wire lock rings side view projection.

FIG. 4-10 shows a left hand cross section of the tool pushing the wire lock ring into the retainer piston bore groove.

DETAILED DESCRIPTION

DRAWING 1 shows the basic system and its components.

FIG. 1-1 shows a front view of a retaining ring 1 made especially for a strong; shear load capacity called a "spiral lock ring". These rings are made of heat-treated spring carbon, steel or 17-7 stainless steel as standard items. They can also be customized by using other exotic materials. These rings are made of flat springs, having a rectangular section, which is wound flat. The first and last ½ loops are terminated by an inside recessed notch 2 & 2A. The external half loop offers greater flexibility and compressibility than the center ones and is a major factor in helping a distortion, necessary to enter the bore.

FIG. 1-2 shows the right-hand side elevation of the stack of spires 3 which are pre-stressed and pressing against each other. Such a component has an entity consisting of a rigid, cylindrical loop, compared to the simple thickness of a retaining ring. The loop structure makes it very difficult to change the shape of the loop, as the need arises, to try to reduce the diameter, allowing insertion on a grooved bore. This requires a reduction in the diameter of nearly 1/10 of an inch prior to being inserted and released into the groove. High production shows a method of passing the helical rings through a cone, aligning them with the bore, and using very high pressure from a piston tool, thus distorting the shape and forcing it into the bore, which is aluminum. Such methods leave a lot to be desired, because the potential of permanently stress damaging the spiral lock ring. It leaves bore scratches and loose scrap residue, which are dangerous to the engine.

FIG. 1-3 shows the spires 5 & 6 with only ½ turn, having an open free end that can easily be deflected as a cantilever beam. The spire 4 is a full turn.

FIG. 1-4 shows the effect of squeezing, with a force F1, the first spire from 6 to 6*a* deflects it, thus helping to reduce the diameter of the first spire.

FIG. 1-5 shows the center spire with a full turn loop, requiring more pressure force F2 to deflect it, see the front of 4*a* & 4*b*. This egg shaped distortion does not help in reducing the diameter but the spire loops, being a part of a multi-helical spire, reacts on each other, elongating the spiral length. Thus enabling the reduction of the outside diameter of the spiral lock.

FIG. 1-6 shows how the last spire 5, FIG. 1-3 is inserted on a path shown by arrow 9*a*. The guidance of the spiral lock through the spiral groove 9, which is cut into the front of the shank 7 and may have a rectangular shape, transfers the spiral lock onto the tool. The pitch of the grooved spiral is large enough to spray the spire and allow the pressure to cause an overall elongation. This consequentially produces a diameter reduction, as the spire enters the bore. In front of the shank, a protruding, smaller diameter shank 11 helps support the ring on its inner diameter. Behind the head 7, a smaller diameter shank links the head to the handle of the tool.

FIG. 1-7 shows a magnified detail of a section of the ring fitting inside the slot 9. A gap 12 between the bottom of the groove and the inner ring allows a space for the reduction of the diameter of the outside ring. Also, a gap 13 between the width 9*b* of the groove and the spire's thickness, 3*a,* is set for optimum freedom of the helical ring spires distortion.

DRAWING 2 shows details of the insertion tool and its usage.

FIG. 2-1 shows a cross-section of a piston head 14 and its cross bore 15 & 16, where a spiral lock ring 3*b* has already been installed on the left side, and where there is a machined groove 15*a* and a wrist pin 16*a* which is already installed.

FIG. 2-2 shows a perspective of the spiral lock ring 17.

FIG. 2-3 shows an elevated profile of the ring 17 in line with the bore 15, FIG. 2-1.

FIG. 2-4 shows the last ½ spire loop 18 has been separated and deflected from the other spires with a sharp tool, such as a sharp edged screwdriver 19 or a strong fingernail. The amount of force needed to flex these spires is relatively easy to overcome on this cantilevers half loop.

FIG. 2-5 shows a perspective of a wire lock ring 20 with an open gap 21.

FIG. 2-6 shows the double functioning insertion tool 26. One function is for the spiral lock ring on the left side and the other is for the wire lock ring on the right side. Considering the great number of lock rings used, the versatility of such a tool is beneficial. However, a single head tool is also available as the need or preference arises. The left side, the head 7 has a spiral groove 9. Such a groove is made on the cylindrical head, with a pitch of around 0.300", for a full turn, extending only approximately 0.400" in length. In front of the head 7 and protruding on the outer extremity is a smaller concentric, diameter shank 11. This supports the spiral rings' inside diameter, which allows the ring to enter and fit the bore 15, as it is compacted and carries the ½ loop into the groove 15*a*, FIG. 2-1. On the right side, a head 24 supports the wire ring and also has a smaller, protruding shank diameter 23. The remainder of the tool consists of concentric shank connections 22 & 22*a* on the left side and 22*b* on the right side. The knurled center mandrel 26*a* is the guiding handle.

FIG. 2-7 shows a left side elevated view of the head 7 with the spiral lock ring 3 installed. The first spire 6 lies outside of the tool's groove nearly ⅓ of a turn. The other spires are being stored, some behind and some partially in the groove 9 and the remaining are behind the head 7 on the shank 22.

FIG. 2-8 shows the front face of the tool with diameters of head 7 & protruding shank 11 The spirals 17 first loop 6 assembly is resting on the tools recessed shank's 11 outside diameter.

FIG. 2-9 shows the right hand view of the front view of the tool FIG. 2-8 and the spiral 3 assembled in the groove, 9, and the spiral lying on shank 22.

FIG. 2-10 shows a wire lock ring 20 with its open gap profile 21.

DRAWING 3 shows the function of the spiral, lock, ring and how it is inserted into the piston cross bore groove.

FIG. 3-1 shows a section of a piston head 14 the bore 15 & the groove 15*a* before the spiral lock ring is to be inserted.

FIG. 3-2 shows how the last spires of the ring 3 being separated from the others and assembled into the spiral groove 9 FIG. 3-3, though the curved arrow 9*a* showing the direction of the feeding path.

FIG. 3-3 shows the tool 26 as the spiral lock ring is being held still, the last spire 5 is entered into the helical groove 9 entrance, see path arrow 9*a*. Then the tool is being rotated clock-wise, relative to the rear of the tool area 27. The spiral lock ring is inserted and threaded through the groove 9 toward the shank 22.

FIG. 3-4 shows the ring installed on the tool head 7 with the first loop 6 protruding out of the groove approximately one half turn.

FIG. 3-5 shows the unusual insertion procedure as the tool's 26 front head center on axis 26*b* which is set at an angle from the bore axis 16*a*. The front spire 6 is partially entered, on an angle, into the bore, and is compressed to allow the tool to be rotated along the arc 14*a*. The compressed spire, fitting the bores diameter, is then pushed into the bore to insert the first loop 6 into the groove 15*a,* which is sensed by the spire snapping into the groove. Also shown is shank, 22, 22*a* and the knurl handle, 26*a*.

FIG. 3-6 shows the front left view, looking through the bore 15 at the first loop 6 of the spiral 3 being installed.

FIG. 3-7 shows the insertion of the remaining spires as head 7 is inserted into bore 15 and the spiral lock 3 and the first spire 6 is snapped into groove 15*a*. Then the tool handle 26*a* connected to the head by shank 22 & 22*a* is rotated counter clock-wise. This is smoothly feeding all remaining spires in a progressive way due to two principles:

1. The groove 9 low-pitched angle provides a mechanical force multiplier.
2. The spires of the spiral lock are spread due to the grooved shape. This will open wide the spiral lock, which allows easier flexibility and contributes to reducing the outside diameter of the ring.

FIG. 3-8 shows the cross-section of the right side of the insertion tool with the arrow showing the direction for the rotation of the handle of the tool 26*a*.

FIG. 3-9 shows the entire spiral lock ring 3 in the bore groove 15*a*.

FIG. 3-10 shows the tool 26 being removed from the bore 15, FIG. 3-9.

DRAWING 4 shows the function as to how the wire lock ring is inserted into the groove of the cross bore with a hand tool.

FIG. 4-1 shows a front view of the wire lock ring 20 with an open gap 21.

FIG. 4-2 shows a detailed view, of the right hand profile of the wire lock insertion tool 26, knurl handle 26*a* connecting shank diameter 22*b* to the head diameter 24, ring holder's recessed diameter 23.

FIG. 4-3 shows the profile of the wire lock ring 20 with the location of the gap 21.

FIG. 4-4 shows the ring 20 being held on the tool end 23 and being manually compressed, arrow 20*a* against the bottom corner of the bore 15 of the piston head 4.The tool 26 is sufficiently inclined to enter through the edge of the bore. The gap 21 is being set midway between the top and the bottom of the ring to compress the gap, with ease. The tool is then rotated along the arc arrow 37, so that it can be lined up with the bore. It is then pushed inward, entering the bore until the compressed wire lock spring pops up in the groove. Such action requires dexterity and practice, yet remains a very simple way to assemble the wire lock ring.

FIG. 4-5 shows the shank 30, integral and concentric to the handle 26*a*. The outside diameter of shank 30 is sized to insure the capability of sliding it into the bore 15, FIG. 4-10. At the right hand of shank 30 extremity, a protruding shank 23 fits into the internal diameter of the ring 20 FIG. 4-1. It also contains a finger 28 that has a thickness equal to the gap between shank 30 outside diameter and the inside diameter of sleeve 29. This finger's outer face has a tangential curve of the diameter of shank 30. This finger also protrudes 3/32 to ⅛ further than plane 23*a*.

FIG. 4-6 shows a partial top view of the tool's right hand and the slide 29, equipped with an integral, larger, knurled ring 29*a* to allow manual positioning, either forward, backward or rotated in a radially locked position 35*b*. It also shows a set of two cutout notches 33 and 34 diametrically opposite on the sleeve. The slider 29 has two notches 33 and 34 that are cut through the sleeve. This allows a nosed finger pliers to insert the ring compressed in the gap 23*b*. The finger 28 allows orientation of the assembly positioning of the gap 21.

FIG. 4-7 shows a right hand front view of the FIG. 4-5, notches 33, 34 and finger 28.

FIG. 4-8 shows the wire lock ring 20 being compressed by a tool acting along the arrow 20*b*-20*c* through the notches 33 & 34 in FIG. 4-7.

FIG. 4-9 shows a profile of the ring 20.

FIG. 4-10 shows the shank 30 after being rotated and unlatched from groove 35*b* FIG. 4-6. This allows the sleeve 29 to be retracted from the shank's 30 right end to allow it to penetrate bore 15 and transfers the wire lock ring into groove 15*a* of piston head 14.

The invention claimed is:

1. A tool for installation of a multi-turned spiral lock ring via one end of the tool and a wire lock ring via an opposite end of the tool, into a bore groove of a wrist pin cross bore of a piston assembly, the tool comprising:

a. a center, knurled, round handle adapted to be manually grasped and rotated by a user;

b. a first cylindrical tool section at the one end of the tool adjacent the handle, the first cylindrical tool section being of a diameter corresponding to the bore to facilitate installation therein, the first cylindrical tool section having a first head with a helical rectangular-cut groove having only a half turn on a front face of the first cylindrical tool section immediately adjacent a protruding smaller diameter of the first cylindrical tool section, the helical groove having a depth, width, pitch and length relative to the multi-turned spiral lock ring so as to receive within the helical groove the spiral lock ring in a condition expanded axially from a relaxed condition thereof to reduce the diameter of the spiral lock ring sufficiently to enable the spiral lock ring to be transferred within the bore and into the bore groove;

c. a second cylindrical tool section at the opposite end of the tool adjacent the handle, the second cylindrical tool section having a second head with an outside diameter portion fitting the bore and having a protruding concentric smaller shank sized to allow the second cylindrical tool section to compress diametrically the wire lock ring to slide within the bore until the compression of the wire lock ring releases at the bore groove to receive the wire lock ring in the bore groove.

2. A tool as described in claim 1, which sets the spiral lock ring so that only a half turn of the spiral lock ring is in front outside of the first cylindrical tool section and outside the helical groove, a portion of the spiral lock ring remains in the helical groove and another portion of the spiral lock ring remains behind the first head.

3. A tool as described in claim 1, with a modified head, where a centrally positioned sleeve, allows the wire lock ring to be mounted and keeps the wire lock ring in abutment with the second cylindrical tool section, which also is, through a slotted sleeve, and a guiding pin, attached to the tool allowing the wire lock ring to be compressed.

4. A tool as described in claim 1, comprising a system that allows smooth and easy handling and installation of the spiral lock ring and wire lock ring into the bore groove, and, in either case, the system having a simple construction design, to handle the installation efficiently and to be manufactured economically.

* * * * *